March 20, 1928.
H. MISCAMPBELL
HYDRATING UNIT
Filed Dec. 14, 1925
1,662,932
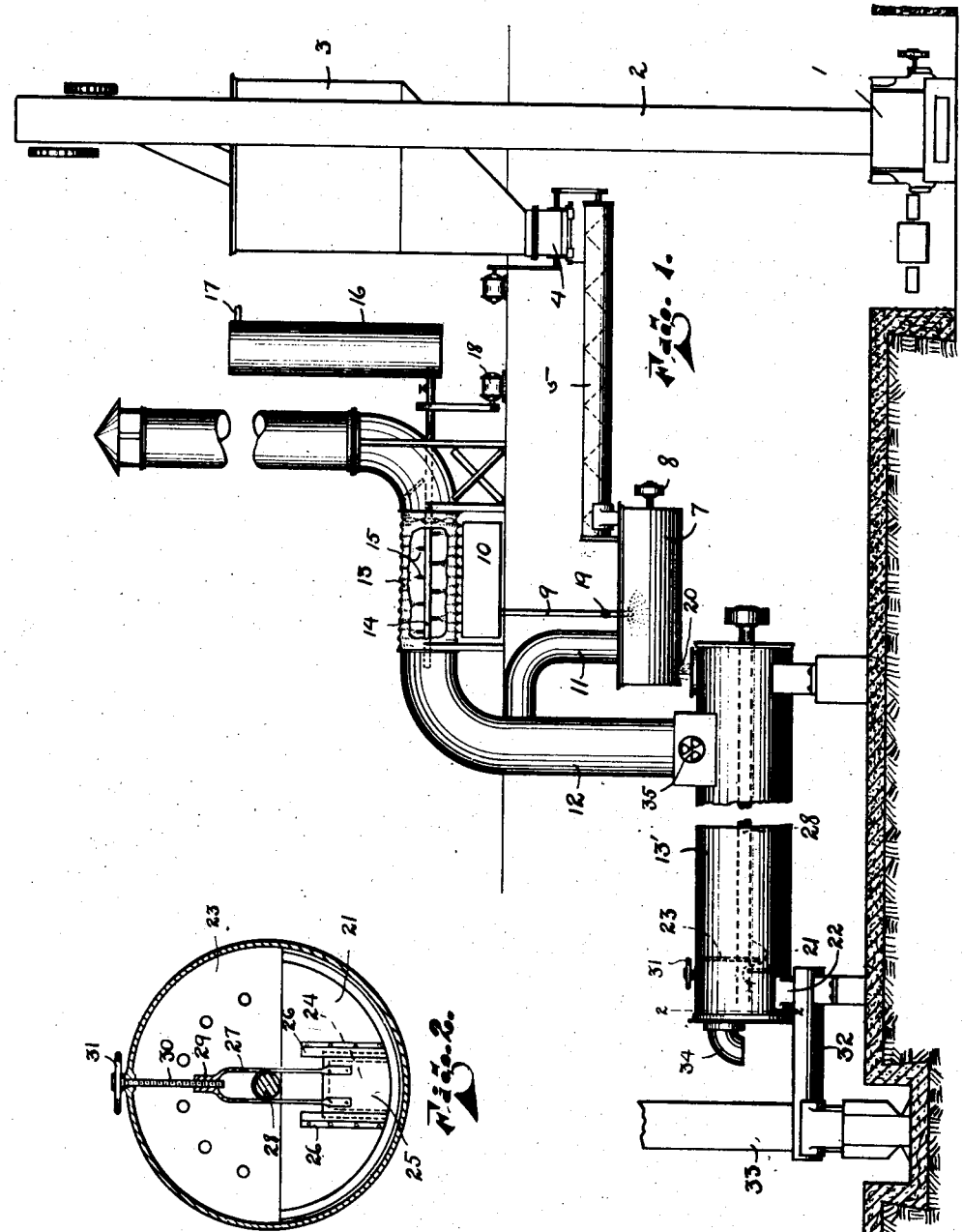
Inventor
HUGH MISCAMPBELL,
By
Attorney Patented Mar. 20, 1928.

1,662,932

UNITED STATES PATENT OFFICE.

HUGH MISCAMPBELL, OF DULUTH, MINNESOTA.

HYDRATING UNIT.

Application filed December 14, 1925. Serial No. 75,480.

This invention relates to lime hydrating equipment and has particularly reference to a lime hydrator for the continuous hydration of lime from the raw lime stone to the finished product.

The principal object of the present invention is to produce as simple and efficient an hydrating unit of this character as possible.

Other objects and advantages of the novel combination of parts will appear in the further description of the invention.

Referring now to the accompanying drawing, forming part of this application and wherein like reference characters indicate like parts:

Figure 1 is an elevation of a hydrating plant embodying the invention, and

Figure 2 is an enlarged cross sectional view on the line 2—2, Figure 1.

1 represents any type of modern lime stone crusher or pulverizer, preferably installed within a pit beneath the surface of the ground or floor upon which the major portion of the hydrator is located. 2 represents a vertical elevator for conveying the crushed lime from the crusher and discharging same into the hopper 3, at the lower end of which is the slide feeder 4 which feeds the crushed lime from the hopper into the spiral conveyor trough 5, disposed horizontally and discharging into paddle or spiral mixing hydrator 7, driven in any desired manner as by the pulley 8. Water is supplied to the hydrator through the pipe 9 from the tank 10, and it is in the hydrator 7 that the initial hydration of the lime takes place. To partially care for the steam, dust and heat arising from the hydration of the lime I have provided the stack 11 extending upwardly from the hydrator to the steam and dust conduit 12 which extends upwardly from the mixer and cooler 13 and out through the roof of the building to the atmosphere. Within the stack 12 there is a horizontally disposed corrugated section 13 provided with a horizontally disposed axial water supply pipe or shaft 14, it having a plurality of spray nozzles 15 fixed thereto communicating with the interior of the pipe 14, which pipe extends horizontally out through the pipe to the water supply tank 16, the intake of said tank being shown at 17. The pipe or shaft 14 is rotatably mounted within the stack and tank by means of any suitable fluid tight packing joints and may be when required rotated at any desired speed by the motor 18. Ordinarily there is sufficient "head" in the tank 16 so that the water passing therefrom through the horizontal shaft 14 will spray out through the nozzles 15, but when the pressure is not sufficient for such the motor may be started revolving the shaft and by centrifugal force the water will be sprayed from the nozzles thus causing a cloud of vapor within the stack, and through which the steam, dust, etc., from the stacks 11 and 12 must pass. It is evident that any dust within the horizontal section 13 of the stack will be precipitated and fall with the water to the bottom of the pipe, from whence it passes through small holes drilled through the bottom of each corrugation to the storage tank 10, and from thence through the pipe 9, controlled by the valve 19 to the hydrator for initially hydrating the lime. Thus the water used in hydration catches the dust rising from the hydrating process and returns it to the hydrator.

The lime is forced longitudinally through the hydrator as it receives its initial bath of water and falls through the discharge opening 20 into the cooling and mixing chamber or conduit 13'. Near the discharge end of the cooler there is provided an upright dam indicated at 21 the same covering the entire lower half of the chamber or cooler, and between which dam and the adjacent end of the cooler is a suitably controlled discharge orifice 22. Just forwardly of the dam 21 is indicated at 23 a depending check plate or baffle, the same covering the entire upper half of the cooler and is for the purpose of preventing the coarser material, being conveyed through the cooler, from being lifted by the paddles therein over the dam 21. Thus the material is conveyed longitudinally through the cooler, and as indicated by the arrow between the plate 23 and dam 21 out through the discharge orifice 22. In order that the cooler may be completely emptied at the close of the hydration, or for cleaning out the coarser material, there is provided an opening through the dam 21 as indicated in dotted lines at 24, which is normally closed by the vertically reciprocable gate 25, operable within a pair of Z-shaped clips 26 fixed to the dam. The free ends of a yoke 27 are fixed to the gate for raising same when desired, said yoke straddling the axial shaft 28 of the cooler and at the upper end formed into a hub 29 within which is screw threadedly mounted the elongated bolt 30 operable by the hand wheel 31, the bolt freely passing through the shell of the cooler. Thus by turning the hand wheel 31, the yoke will be raised or lowered upon the bolt carrying with it the gate, as is obvious.

The cooler 13 is made sufficiently long in each installation so that the hydrated lime will be completely dry when it falls therefrom through the orifice 22 to the conveyor 32 and conducted from thence directly into the lower end of the elevator 33 from which it may be discharged into storage bins, or any suitable type of bagger may be fixed to the end of the conveyor 32 for bagging the product as it is discharged therefrom.

From the foregoing it is evident that I have devised an exceedingly simple but complete hydrating plant of moderate capacity and one which may be installed with a minimum of cost.

Any suitable form of ventilator, such as that indicated at 34 is provided through the discharge end of the cooler 13', which ventilator may be controlled by a damper if desired and is for the purpose of admitting the required amount of air to expedite the cooling process; and there is shown at 35 a damper for controlling the draft within the stack 12.

Having thus described my invention, what I claim and desire to secure by Letters Patent, is:

1. A lime hydrator including a final conveying and cooling chamber, a dam transverse the discharge end of said chamber whereby to prevent the discharge of the coarser material, and means for optionally discharging the coarser material through the dam.

2. A continuous hydrating unit of the type described comprising a crusher, a hydrator, means for conveying the crushed lime from the crusher to the hydrator, a water supply for said hydrator, means for drawing off the steam and dust caused by hydration, rotating water discharging nozzles for precipitating said steam and dust into the water supply, a conveyor and cooler into which the hydrator discharges, a discharge from said conveyor and cooler, and separate, selective means whereby either the finer or coarser products of hydration may be discharged from said conveyor and cooler.

3. A hydrating unit comprising a crusher, a hydrator, means for conveying crushed lime from the crusher to the hydrator, a water supply for said hydrator, a conveyor and cooler into which the hydrator discharges, and separate selective means whereby either the finer or coarser products of hydration may be discharged from said conveyor and cooler.

In testimony whereof I hereunto affix my signature.

HUGH MISCAMPBELL.